April 29, 1924.

T. BACIGALUPI

BICYCLE PEDAL SPINDLE

Filed Sept. 5, 1922

1,492,191

INVENTOR.
Tony Bacigalupi
BY
ATTORNEY

Patented Apr. 29, 1924.

1,492,191

UNITED STATES PATENT OFFICE.

TONY BACIGALUPI, OF STOCKTON, CALIFORNIA.

BICYCLE PEDAL SPINDLE.

Application filed September 5, 1922. Serial No. 586,131.

*To all whom it may concern:*

Be it known that I, TONY BACIGALUPI, a subject of Italy, residing at Stockton, county of San Joaquin, State of California, have invented certain new and useful Improvements in Bicycle Pedal Spindles; and I do declare the following to be a full, clear, and exact description of the same, reference being had to the accompanying drawings, and to the characters of reference marked thereon, which form a part of this application.

This invention relates to improvements in bicycle parts, and particularly to the pedal spindles thereof; the principal object being to provide a spindle of this character especially adapted to be installed in place of the original one when the connection of the latter with the crank arm has been ruined.

As ordinarily made, the pedal spindles are threaded into the crank arms. If the pedals become frozen onto their spindles, as they are apt to do, especially with careless users, the ultimate result of continued use of the pedals in the above condition is stripping of the threads on the spindle and crank arm.

It has been attempted to make repairs by bushing the stripped hole so as to provide a new surface for cutting threads of the original diameter. The crank-arm stock around the hole however is insufficient to permit of this being done with any hope of strength remaining in the repaired member.

A common method at present therefore is to break off a piece of the crank arm and weld on a new piece containing a freshly tapped hole in its place. Needless to say this is a crude and relatively costly and slow procedure, and detracts from the appearance of the bicycle if nothing else.

With my improved spindle, it is unnecessary to do anything to the original crank arm, which is left in the condition in which it is brought into the shop, and the new spindle may be firmly installed in a few seconds.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
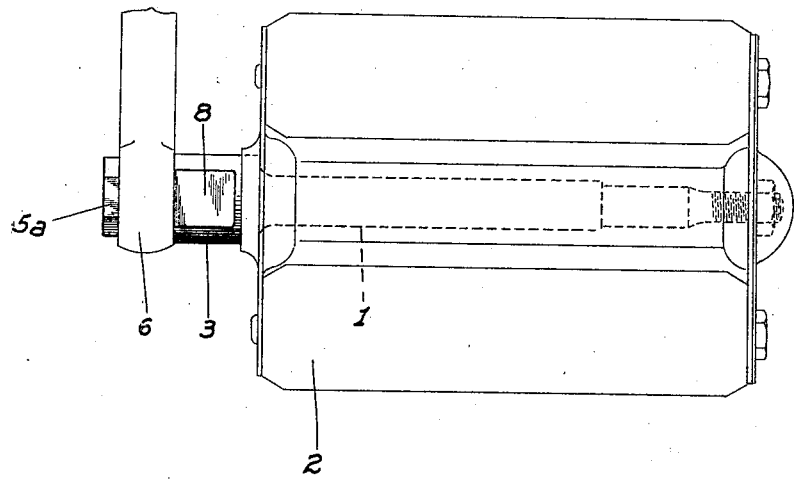
Fig. 1 is a view of my improved spindle showing the same in connection with a pedal and mounted on the crank arm.
Figure 2:
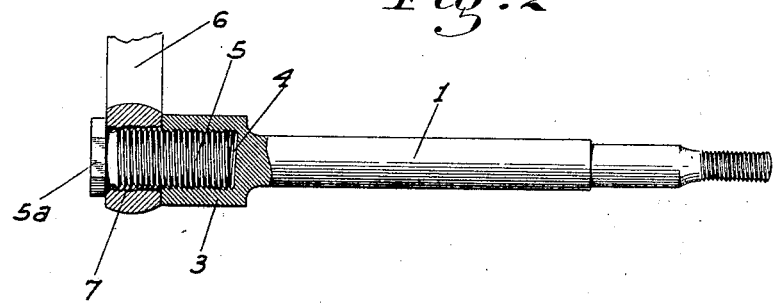
Fig. 2 is a view of the spindle, detached from the pedal and partly in section.

Referring now more particularly to the characters of reference on the drawings, the numeral 1 denotes the main portion of the spindle, adapted to support the usual pedal 2. The end of the spindle which projects outwardly of the pedal is formed as an enlarged portion 3 tapped as at 4 to receive a cap screw 5.

The outer end of the portion 3 is adapted to abut against the face of the crank arm 6, while the head 5ª of the screw 5 bears against the opposite face of said arm, so that the screw before engaging the threads of the tapped orifice 4 passes through the hole 7 in the crank arm, no attempt being made to have the threads of the screw cooperate with the mutilated or stripped threads of the hole 7, the screw being made of a size to pass readily through said hole.

It will therefore be evident that to install my improved spindle it is only necessary to place the same against the outer face of the crank arm, insert the screw through the hole 7 and into the tapped hole 4 from the opposite face of the crank arm, and tighten the screw until the head of the screw and member 5 are clamped tightly against the opposite faces of the crank arm.

The spindle may be held against rotation while the screw is being cinched up, since the opposite sides of the portion 3 are flattened as at 8 to enable an ordinary wrench to be engaged therewith.

From the foregoing description, it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

An article of manufacture comprising a repair element for bicycle pedals consisting of a unitary spindle piece having a threaded orifice in one end of a diameter less than the diameter of the orifice in the crank arm for the pedal, and a cap screw to fit the threaded orifice, the cap on the screw being of a greater diameter than the orifice in the crank arm.

In testimony whereof I affix my signature.

TONY BACIGALUPI.